United States Patent [19]
Becker

[11] Patent Number: 4,764,772
[45] Date of Patent: Aug. 16, 1988

[54] SCANNING-BEAM MICROWAVE LANDING SYSTEM

[75] Inventor: Klaus Becker, Stuttgart, Fed. Rep. of Germany

[73] Assignee: Standard Elektrik Lorenz AG, Stuttgart, Fed. Rep. of Germany

[21] Appl. No.: 55,457

[22] Filed: May 28, 1987

[30] Foreign Application Priority Data

Jun. 3, 1986 [DE] Fed. Rep. of Germany ....... 3618628

[51] Int. Cl.$^4$ ............................ G01S 1/16; H01Q 3/00
[52] U.S. Cl. .................................... 342/408; 342/360; 342/35
[58] Field of Search ................... 342/351, 360, 35, 408

[56] References Cited

U.S. PATENT DOCUMENTS

| 3,975,736 | 8/1976 | Ewen et al. | 342/424 |
| 4,041,492 | 8/1977 | Toman | 342/408 |
| 4,333,081 | 6/1982 | Höfgen | 342/408 |
| 4,536,766 | 8/1985 | Frazita | 342/351 |

FOREIGN PATENT DOCUMENTS

| 0200598 | 3/1986 | Europan Pat. Off. |
| 3131494 | 2/1983 | Fed. Rep. of Germany |

OTHER PUBLICATIONS

1981 Copy of brochure entitled Microwave Landing Systems, The New International Standard, by Henry W. Redlien and Robert J. Kelly pp. 311, 314–316, 330, 340–356, and 404.

*Primary Examiner*—Theodore M. Blum
*Assistant Examiner*—David Cain
*Attorney, Agent, or Firm*—Christie, Parker & Hale

[57] ABSTRACT

In the basic configuration of the microwave landing system, an azimuth station (2) and an elevation station (1) are interconnected by a data link for transferring data and sync signals, and each of the stations includes a monitoring facility (10, 15; 3,8) for monitoring its signals in the near field. In the novel microwave landing system, the near-field monitoring facility of one of the stations is also used to monitor the signals from the other station in the far-field.

7 Claims, 3 Drawing Sheets

SCANNING-BEAM MICROWAVE LANDING SYSTEM

TECHNICAL FIELD

The present invention relates to a scanning-beam microwave landing system.

BACKGROUND ART

A prior art scanning-beam microwave landing system (hereinafter abbreviated to MLS") is described in detail in an article by H. W. Redlien and R. J. Kelly, "Microwave Landing System: the New International Standard", Advances in Electronics and Electron Physics, Vol. 57, Academic Press, Inc., 1981 (ISBN 0-12-014657-6), pages 311–410. Accordingly, said article is hereby incorporated by reference in its entirety, as are the other references cited therein. The following passages should be particularly noted:

Pages 311–410 (description of the principle),
Page 330 (description of the sequence of signals radiated from the individual stations),
Pages 340–349 (description of the MLS ground station),
Pages 349–357 (description of the MLS airborne equipment), and
Page 404 (description of the monitoring function).

In radio navigation systems such as the MLS described in the above-cited Redlien et al article, it is very important that the radiated signals remain within certain specified values. To monitor this, the MLS contains field monitors, antenna aperture (integral) monitors, and internal monitors.

The field monitors monitor whether the radiated signals meet certain specifications. A distinction is made between near-field monitors (which are located in the immediate vicinity of the station to be monitored) and far-field monitors (which are typically located at a distance of at least several hundred meters from the station to be monitored). The ground equipment of a basic (prior art) MLS consists of an elevation station and an azimuth station. At larger airports, there may also be provided a back azimuth station, which provides azimuth guidance after a missed approach.

The MLS operates at very high frequencies (typically in the 5 GHz range) which make it necessary to take special precautions to eliminate unwanted reflections from other objects within the systems's effective coverage area. Such an "object" may even be the antenna of a far-field monitor, for example.

DISCLOSURE OF INVENTION

A principal objective of the present invention is to provide a scanning-beam microwave landing system which permits good monitoring of the radiated signals in the far field, preferably without materially adding to the expense or complexity of the system.

In the MLS of the present invention, each station may be used to monitor the signals from another station in the far field. In the elevation station, for example, the signals radiated from the azimuth station may be monitored. In accordance with a specific aspect of the present invention, this can be done using the elevation station's near-field monitoring apparatus, so that the advantages of the present invention may be obtained for a relatively low cost. Even if an additional antenna is provided for monitoring the azimuth signals, in accordance with the present invention it is still in the immediate vicinity of or at the elevation station and the amount of apparatus required for monitoring purposes is still small. Since no additional equipment that may cause reflections is required (other than possibly in the vicinity of an already existing station), a far field monitoring facility constructed in accordance with the teachings of the present invention causes no additional undesired reflections.

In the MLS, all data relevant to the monitoring function are available in one of the stations (usually the azimuth station) and are transferred from there to, e.g., the airport control tower. Therefore, the individual stations are connected to the azimuth station by data and control lines. In accordance with another specific aspect of the present invention, these lines can also be used for far-field monitoring, which would not be possible for a prior art MLS in which the far-field monitoring station is located independently of the other stations. The novel MLS thus requires no additional lines for far-field monitoring.

Moreover, if the near-field monitor of the back azimuth station is used for far-field monitoring of the azimuth signals from the azimuth station, the azimuth signals can be monitored exactly in the approach direction.

According to a further advantageous aspect of the invention, the same antenna of the station via which the signals for landing guidance are radiated may also used for monitoring purposes. This has the advantage that a highly directional antenna is available for receiving the signals to be monitored.

BEST MODE FOR CARRYING OUT THE INVENTION

In the MLS, two very narrow beams are scanned in the azimuth plane and the elevation plane, respectively, to provide landing guidance. Beam scanning is preferably performed electronically. The angle information is obtained in a receiver aboard an aircraft (hereinafter referred to as the "MLS airborne equipment") by measuring the time taken for the beam to pass the airborne equipment in one direction, go to the limit of its sweep, and pass the airborne equipment again on its return sweep.

Figure 1:
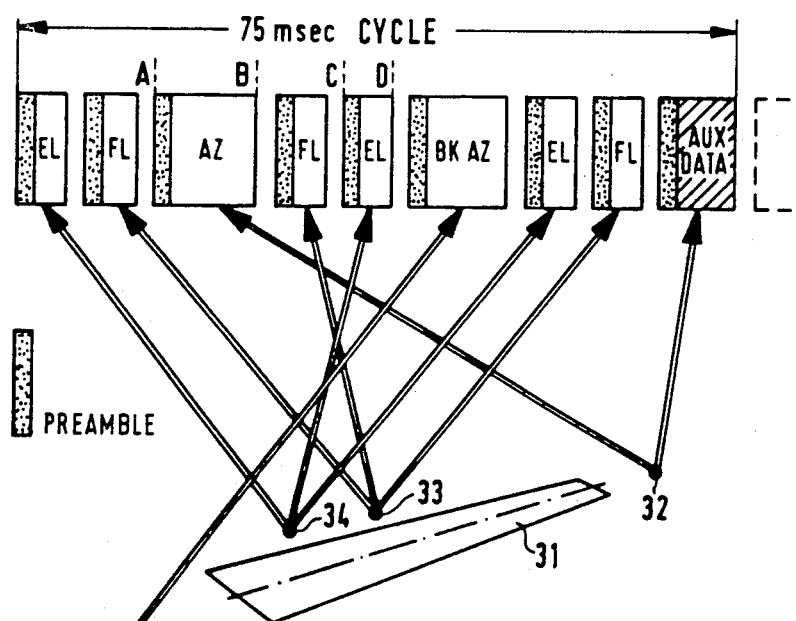
FIG. 1 shows a cycle of the signals radiated from the stations.
Figure 2:
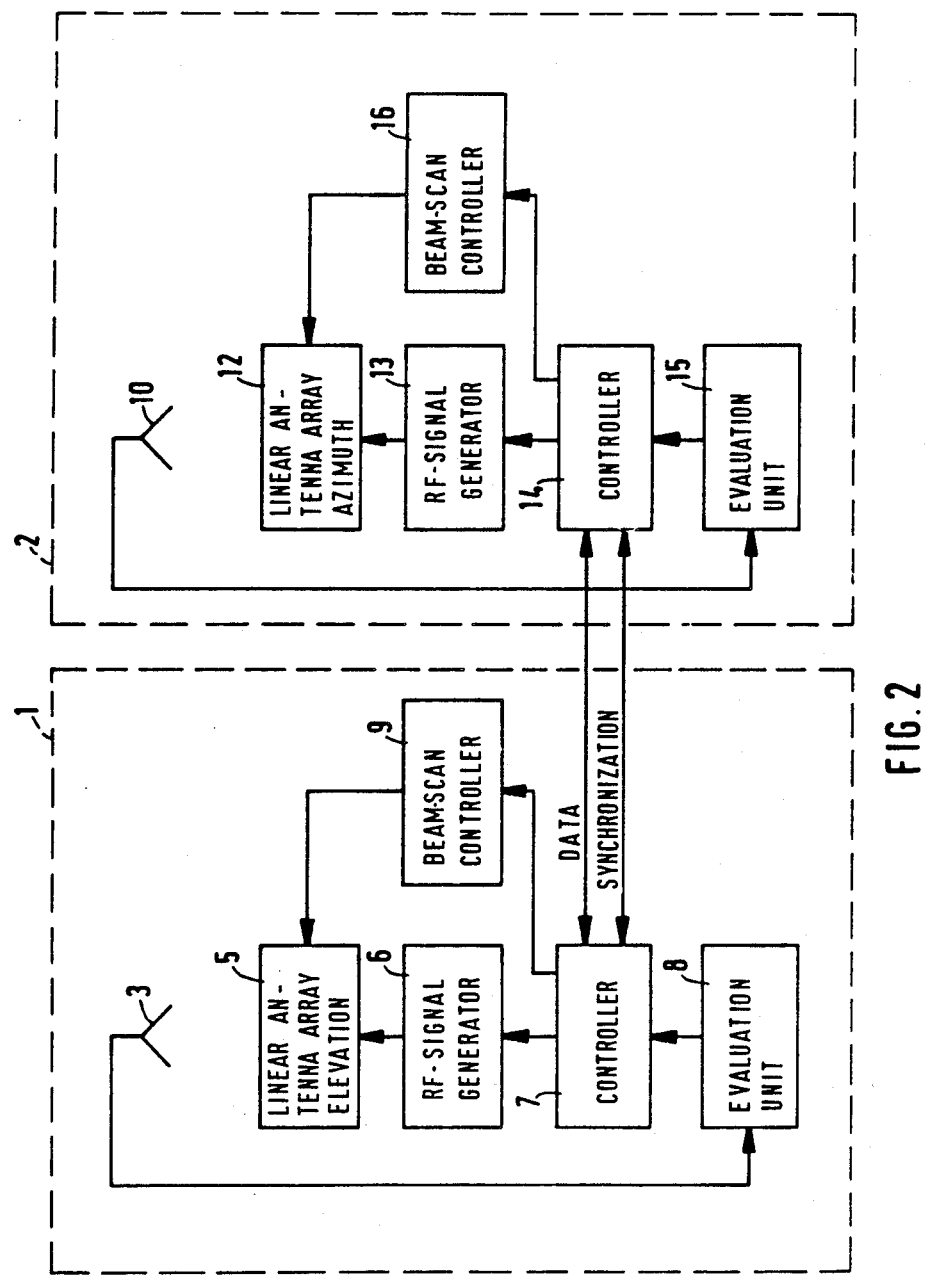
FIG. 2 shows block diagrams of an azimuth station and an elevation station.

Referring now to FIG. 1, it may be seen that in the MLS, as in the conventional instrument landing system (ILS) which is already in use worldwide, an elevation station 34 is located at the side of the runway 31, and an azimuth station 32 is located at the far end of the runway. For some airports, additional equipment in the form of a flare station 33 may be desirable. To provide azimuth guidance in the direction of departure after a missed approach, a back azimuth station 35 may be located at the end of the runway opposite the azimuth station. The individual signals are transmitted using time-division multiplexing, as indicated in the upper portion of the Figure. A cycle within which all necessary signals are radiated lasts 75 ms. Each signal is preceded by a preamble, the details of which are irrelevant to the present invention. The abbreviations in FIG. 1 have the following meanings:
EL: Data for elevation guidance
FL: Data for guidance during the flare maneuver
AZ: Data for approach azimuth guidance
BKAZ: Data for missed approach azimuth guidance
AUXDATA: Additional data The construction of MLS elevation and azimuth stations is generally known from the literature and, therefore, will not be explained here in further detail. However, FIG. 2 shows certain novel aspects of the elevation station and the azimuth station and reference should be made thereto and to the following detailed description so as to provide the skilled artisan with a better understanding of the invention and of a preferred implementation thereof. The flare station and the back azimuth station may be implemented in a similar manner.

The azimuth station 2 is the central station of the entire landing system. In it, the signals required to synchronize the individual stations are generated (The signals are radiated using time-division multiplexing, as indicated schematically in FIG. 1). It receives all information on the conditions of the individual stations, particularly the data determined with the aid of the monitors (near-field monitoring; integral monitoring).

The individual stations may be, as far as possible, modular in construction, and it is desirable to use hardware modules of identical design in both stations. It is possible, for example, to implement the azimuth evaluation unit 8 and the elevation evaluation unit 15 in the azimuth station 1 and in the elevation station 2 respectively, with hardware of the same design, the two evaluation units differing only in respect to obvious differences in software.

The azimuth station and the elevation station each have their own respective RF-signal generator 6, 13 for generating the RF signals. The output signal of each of these devices is applied to a respective linear antenna array 5, 12. (Alternatively, a planar arrangement of antenna elements could also be used.) The linear antenna array 5 of the elevation station 1 scans a radiation lobe in the elevation direction. The linear antenna array 12 of the azimuth station 2 scans a lobe in the azimuth direction. Each of the RF-signal generator devices 5, 13 is controlled by a respective controller 7, 14. The controller 7 of the elevation station receives synchronizing signals from the controller 14 of the azimuth station and supplies data to the controller 14. Each of the controllers 7, 14 also controls a respective beam-scan controller 9, 16, which, in turn, controls controllable phase shifters in the respective linear antenna array 5, 12 so that the desired beam scanning is implemented. Each of the two stations has a near-field-monitoring antenna 3, 10, whose output is fed to the associated evaluation unit 8, 15. The monitoring facilities, consisting of the evaluation unit and the monitoring antenna, deliver monitoring data to the associated controllers. Over the data link between the controller of the elevation station and the controller of the azimuth station, the monitoring data obtained in the elevation station is transferred to the azimuth station. These monitoring facilities monitor whether the signals radiated from the respective station have the specified parameters in the near field.

Each of the monitoring facilities has a receiving and evaluating portion which is basically implemented like an MLS airborne equipment. Unlike an MLS airborne equipment, which must be adjustable to the frequencies of the MLS stations of different airports, the receiver of the monitoring facility must process only one frequency.

Figure 3:
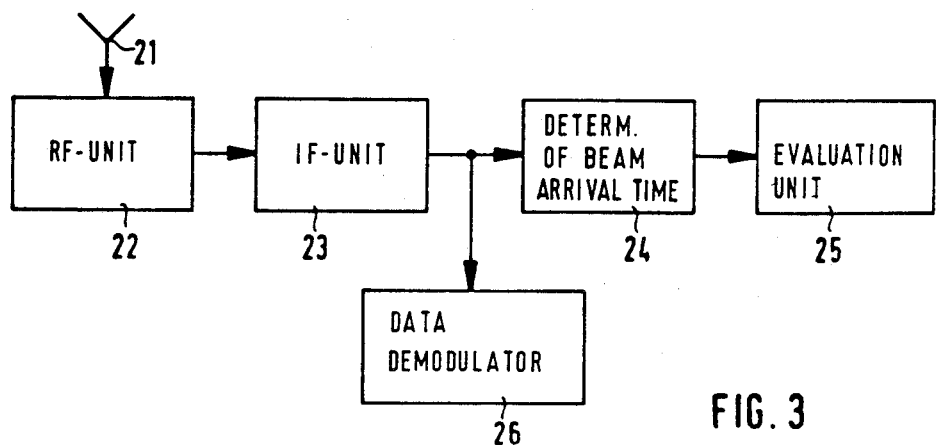
FIG. 3 is a block diagram of an airborne equipment.

In the MLS airborne equipment (FIG. 3), the signal received by an antenna 21 is fed through an RF unit 22 to an IF unit 23. The IF signal is applied to a data demodulator 26 and to a device 24 for determining the time of arrival of the scanned beams. Evaluation takes place in an evaluation unit 25. The operation and implementation of the MLS airborne equipment are generally known and, therefore, were only briefly outlined here.

In the ground stations of the novel MLS, the evaluation units 8, 15 and the monitoring antennas 3, 10 are used not only to monitor whether the signals radiated from the respective station have the specified parameters in the near field, but also to monitor the signals from another station in the far field. In one of the stations, the signals radiated from the other stations can be monitored in the far field. On the other hand, it is possible to use any of the stations to monitor the signals from any of the other stations in the far field. Like the elevation station, all other stations are connected to the azimuth station via a data link for the transfer of data and synchronizing signals. If the back azimuth station is used to monitor the signals from the azimuth station in the far field, these signals are monitored exactly in the approach direction.

In the following it will be assumed that the elevation station 1 monitors the signals from the azimuth station 2 in the far field.

As can be seen in FIG. 1, signals are radiated by only one station at a time. Between the instants A and B, only the azimuth station is active; the elevation station is inactive. During that time, the monitoring antenna 3 of the elevation station receives the azimuth signals. These are passed to the evaluation unit 8 in the elevation station, where they are evaluated in place of the evaluation signals which are evaluated during the time (e.g., between C and D, FIG. 1) that the elevation station is active. The values determined in the elevation unit must now be compared with the nominal values of the azimuth signals instead of the nominal values of the elevation signals.

In relation to the azimuth station, the elevation station is in the far field. In the novel MLS, the elevation station thus monitors the azimuth signals in the far field. The near-field monitoring of the elevation signals and the far-field monitoring of the azimuth signals are performed on a time-division multiplex basis.

The azimuth monitoring function will not be described here as it is basically performed like the elevation monitoring function.

In the following, a few further developments will be explained; it will again be assumed that the far-field monitoring of the azimuth signals is performed in the elevation station.

At an airport, in addition to the MLS signals, numerous other radio signals, such as radar signals, are radiated. At airports with more than one runway, more than one MLS may be installed. It is therefore advantageous to insert suitable filters between the monitoring antenna 3 and the evaluation unit 8. Their passbands are chosen so that only the frequencies of the signals to be monitored are passed.

The instant at which the signal to be monitored should arrive at the monitoring antenna is known, so that in the line between the monitoring antenna 3 and the evaluation unit 8, a time gate circuit (not shown) can be inserted which passes the received signals to the evaluation unit only during the times that signals to be monitored are expected. The control signals can be transferred from the controller 14 of the azimuth station to the elevation station over the sync line. The time gate circuit may also be implemented in the evaluation unit. The details of such an implementation should be apparent to those skilled in the art and, therefore, will not be explained here.

It may also be advantageous to amplify the signals before feeding them to the evaluation unit.

In the foregoing description it was assumed that the antenna used for monitoring the azimuth signals in the far field is the monitoring antenna of the elevation station. In some installations it may be advantageous to provide a separate far-field-monitoring antenna which is optimized for the reception of the azimuth signals both with respect to its spatial arrangement and with respect to its implementation. In this case, too, the signals are evaluated in the evaluation unit of the elevation station. The antenna can be located in the immediate vicinity of or at the elevation station.

Figure 4:
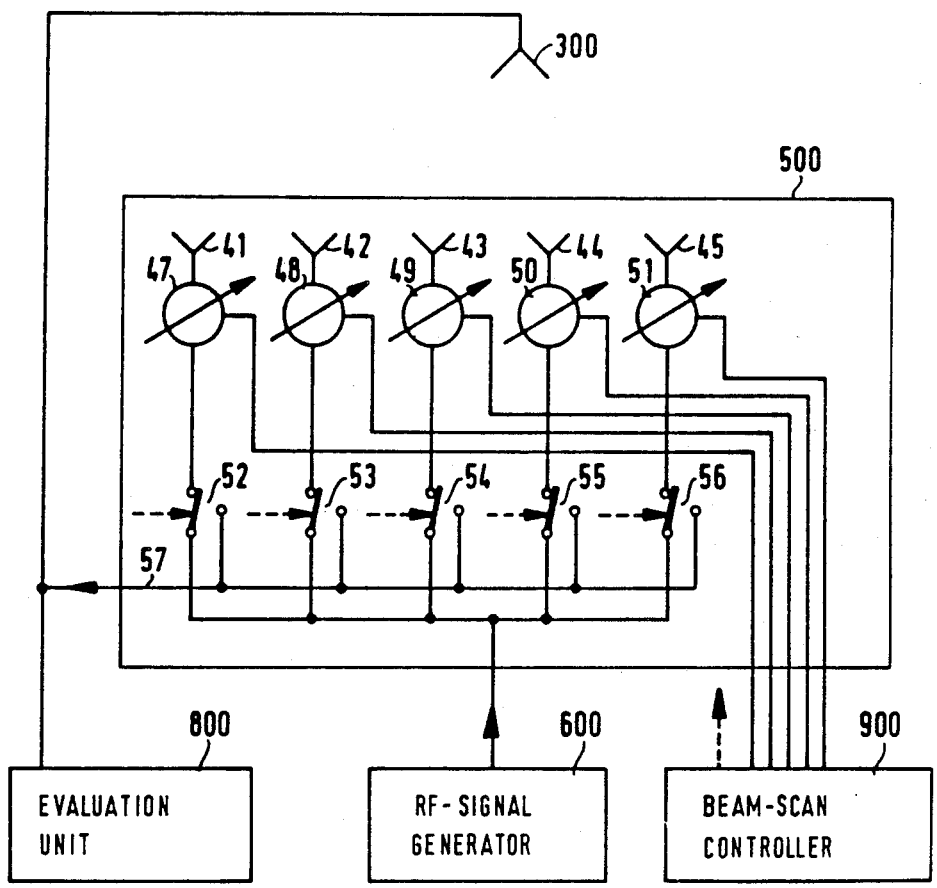
FIG. 4 is a detailed block diagram of a portion of a preferred embodiment of the back azimuth station of FIG. 1.

Another possibility of implementing the antenna for monitoring the azimuth signals in the far field is shown in FIG. 4. It is particularly advantageous if the azimuth signals are monitored in the back azimuth station. (If a runway has an azimuth station at both ends, so that landings are possible in both directions, one of the azimuth stations will be either the azimuth station or the back azimuth station depending on the approach direction). As can be seen in FIG. 1, during the time that the azimuth signal is radiated, no signal is radiated from the back azimuth station. During that time, therefore, the linear antenna array of the back azimuth station, which is normally used to radiate the back azimuth signals, can be used to receive the azimuth signals.

The diagram of FIG. 4 includes an evaluation unit 800, a device 600 for generating the RF signals, and a monitoring antenna 300 of the back azimuth station 35. The monitoring antenna 300, the evaluation unit 800, and the device 600 for generating the RF signals are implemented like the corresponding devices of the elevation station 33, 34. Also provided are a linear antenna array 500 and a beam-scan controller 900.

The linear antenna array 500, like that of the prior art elevation station, has several radiating elements 41 to 45, which are fed with the RF signals through controllable phase shifters 47 to 51; in the back azimuth station, these signals come from the RF-signal generator 600. Switches 52 to 56 are inserted in the feeders between the RF-signal generator 600 and the controllable phase shifters.

The beam-scan controller 900 not only controls the controllable phase shifters so that the desired beam scanning is achieved, but it also controls the switches 52 through 56 (as indicated symbolically with dashed lines). At the time the azimuth signal is expected, the controllable phase shifters 47 through 51 are adjusted by the beam-scan controller 900 such that the resultant radiation pattern points in the direction of the azimuth station 32. At the same time, the switches 52 to 56 are switched such that the lines to the RF-signal generator 600 are open. During that time, the signals received by the antennas are applied via the switches to a line 57, over which they are transferred to the evaluation unit 800.

The present invention has been described above with regard to the certain presently contemplated specific embodiments of the invention. It will be appreciated to those skilled in the art that modifications and variations thereof are possible within the spirit and scope of the appended claims.

What is claimed is:

1. A scanning-beam microwave navigational system comprising
first and second stations selected from the group consisting of:
   an azimuth station,
   an elevation station,
   a flare station, and
   a back azimuth station
said first and second stations each having
   a beam scanning antenna for radiating navigational signals,
   an evaluation unit, and
   near-field monitoring means for monitoring in the near field the navigational signals radiated by said beam-scanning antenna of said each station, said near-field monitoring means comprising
   a near-field monitoring antenna,
wherein:
said first station further comprises
   far-field monitoring means for monitoring in the far field the navigational signals radiated by said beam scanning antenna of said second station, and
said near-field and said far-field monitoring means of said first station function alternately on a time-division multiplex basis.

2. The scanning-beam microwave landing system of claim 1 wherein said first station beam scanning antenna also receives the far-field navigational signals radiated by said second station beam scanning antenna, for processing by said far-field monitoring means.

3. The scanning-beam microwave landing system of claim 1 wherein
said first station far-field monitoring means further comprises a far-field monitoring antenna for receiving said far-field signals, and
said first station evaluation unit is used on a time-division multiplex basis by said far-field monitoring means.

4. A scanning-beam microwave landing system as claimed in claim 3 further comprising
band-pass filter means for passing only said navigational signals for processing by said far-field monitoring means.

5. A scanning-beam microwave landing system as claimed in claim 4, wherein said band-pass filter means further comprises
a band-pass filter centered about the frequency of the far-field signals to be monitored.

6. The scanning-beam microwave navigation system of claim 3 further comprising:
time-gate means for passing signals to said evaluation unit only during the times that the far-field signals from said second station are expected to be received by said first station.

7. A scanning-beam microwave landing system as claimed in claim 1, wherein
the signals to be evaluated by said far-field monitoring means are amplified prior to being further processed.

* * * * *